July 14, 1970 C. W. VAN GILST 3,520,567
GATE LATCH
Filed Jan. 5, 1968
2 Sheets-Sheet 1
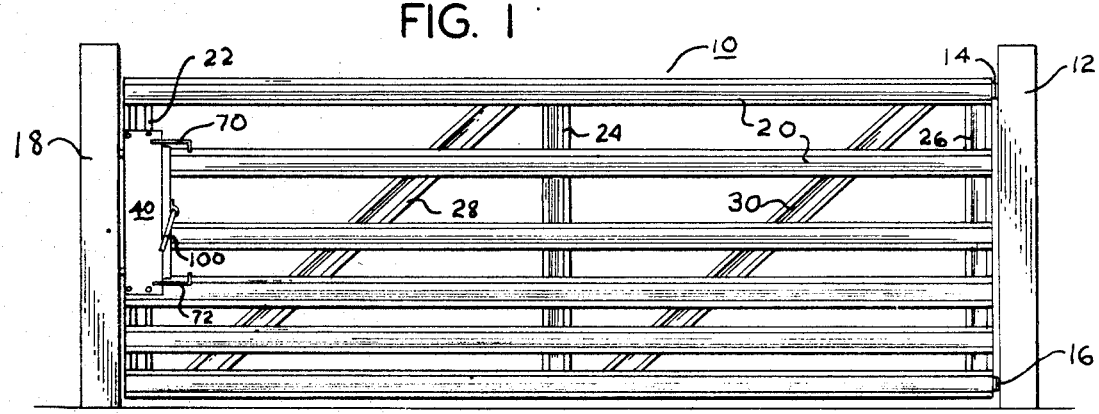
FIG. 1
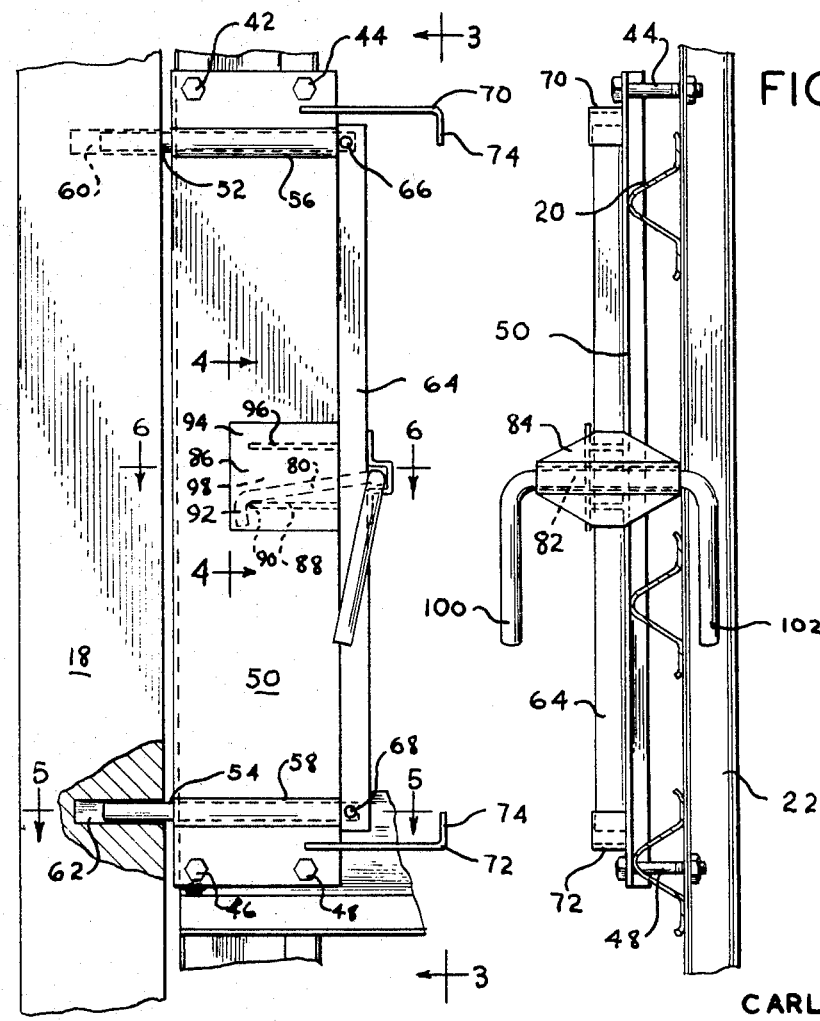
FIG. 2
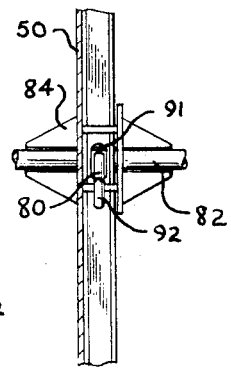
FIG. 3
FIG. 4
INVENTOR.
CARL W. VAN GILST
BY M. A. Hobbs
ATTORNEY

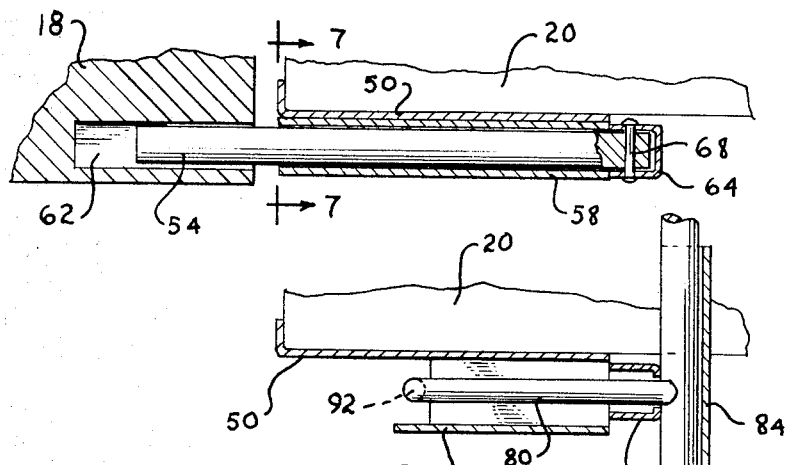
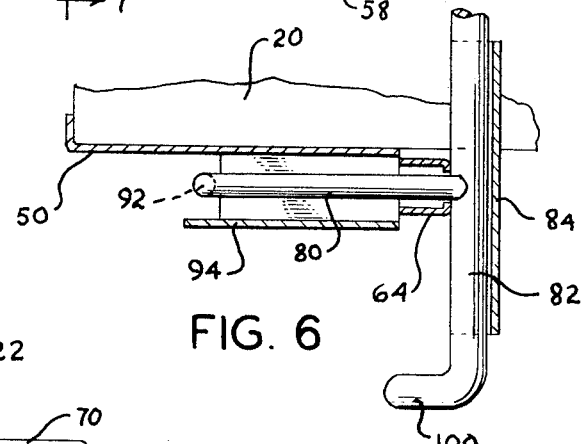
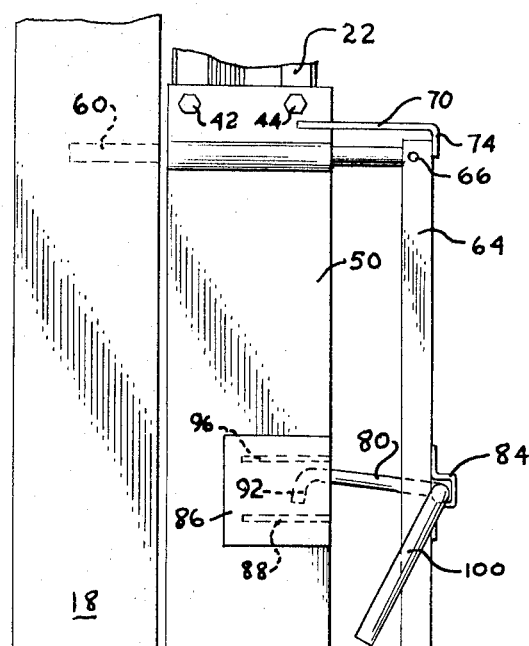
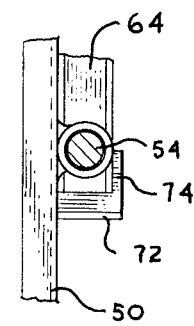
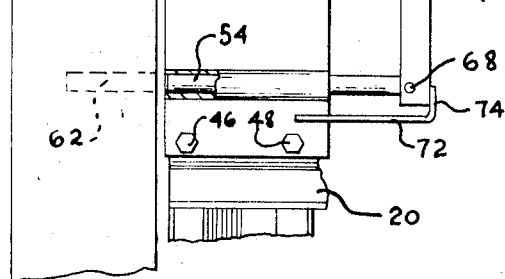

United States Patent Office 3,520,567
Patented July 14, 1970

3,520,567
GATE LATCH
Carl W. Van Gilst, Goshen, Ind., assignor to Bangor Punta Operations, Inc., New York, N.Y., a corporation of New York
Filed Jan. 5, 1968, Ser. No. 695,901
Int. Cl. E05c *1/04*
U.S. Cl. 292—42                                8 Claims

ABSTRACT OF THE DISCLOSURE

A gate latch having two spaced bolts connected by a bar for operating the bolts to and from their locked position. A lock mechanism retains the bolts in their latched position and is operable by the application of force in the direction opposite that of the force required to retract the bolts from their latched position.

---

In the construction of latches for gates for farm livestock, it has been a persistent problem to provide a structure or mechanism which would hold the gate securely closed and effectively prevent the livestock from operating the latch and opening the gate, and yet which was easy for a person to latch and unlatch when the gate was intentionally closed and opened. The prior latches or lock would often give little or no support to the gate or distortional resistance to nudging or bumping of the gate structure by the animals, and hence permitted the gate to be sprung, warped or otherwise damaged while still holding the gate closed. In the past, any one of these problems alone could be overcome, but generally the solution of one of the problems would enhance the difficulty in overcoming one or more of the other problems. It is therefore one of the principal objects of the present invention to provide a latch for a livestock gate, which firmly holds the gate closed and gives support to the gate structure while the gate is closed and which can easily be manipulated by a person to lock and unlock the gate.

Another object of the invention is to provide a gate latch which is so constructed and designed that forces in opposing directions are required to open the lock, thus eliminating the likelihood of farm animals accidentally operating the latch with their heads, and which automatically retains it in latched position until intentionally operated to open the gate.

Still another object of the invention is to provide a gate latch which is relatively simple in construction and operation, and which can readily be installed on most types of gates without altering the basic structure of the gate or requiring a special gate post construction for the latch mechanism.

Additional objects and advantages of the invention will become apparent from the following description and accompanying drawings, wherein:

FIG. 1 is an elevational view of a farm livestock gate showing the present latch mounted thereon;

FIG. 2 is an enlarged elevational view of the present gate latch showing a portion of the gate and the post used in conjunction with the latch;

FIG. 3 is a side elevational view of the latch and a fragmentary cross sectional view of the gate on which the latch is mounted;

FIG. 4 is a fragmentary cross sectional view of the latch, the section being taken on line 4—4 of FIG. 2;

FIG. 5 is a horizontal cross sectional view of the latch and post, the section being taken on line 5—5 of FIG. 2;

FIG. 6 is a horizontal cross sectional view of the latch, the section being taken on line 6—6 of FIG. 2;

FIG. 7 is a fragmentary cross sectional view of the latch, the section being taken on line 7—7 of FIG. 5; and FIG. 8 is an elevational view of the gate latch similar to that shown in FIG. 2, showing the latch in its opened position.

Referring more specifically to the drawings and to FIG. 1 in particular, numeral 10 designates generally a farm livestock gate, 12 a post on which the gate is mounted by hinges 14 and 16, and 18 a post at the free end of the gate. Fencing material is normally secured to the post, although the gate may be used in connection with other structures, such as wall or partition structures of pens, stalls, stables and the like; however, the two posts, or the equivalent thereof, would normally be used in these installations.

For the purpose of the present description, the gate may be considered as conventional, consisting of horizontal panels 20, vertical supports 22, 24 and 26, and reinforcing or bracing panels 28 and 30. The panels are riveted, welded or otherwise joined firmly together to form a rigid gate structure. The panels and other members forming the gate may be of metal, wood or a combination of these materials.

The present latch, indicated generally by numeral 40, is mounted on the free end of the gate and is bolted thereon by a plurality of bolts 42 and 44 in the upper end thereof and by bolts 46 and 48 in the lower end thereof, extending through the latch and through one or more structural members of the gate to rigidly secure the latch to the gate in fixed position. The latch consists of a frame member of backing plate 50 of metal through which the securing bolts extend and which forms the body portion of the latch. The latch is primarily a bolt type construction, having longitudinally movable upper and lower bolts 52 and 54, the upper bolt being slidably mounted in a tubular body 56 and the lower bolt in a tubular body 58. The two tubular bodies are of metal, joined by welding or other securing means to backing plate 50. The two bolts seat in bores 60 and 62 in post 18 and are inserted in the bores simultaneously by a bar 64 connected to the two bolts 52 and 54 by pins 66 and 68, respectively. Bar 64 is adapted to move between the position shown in FIG. 2, wherein the two bolts 52 and 54 are seated in the bores in the post, and the position shown in FIG. 8 with the bolts completely withdrawn from the bores. The movement of bar 64 is limited in the locking direction by the seating of the bar on adjacent ends of tubular members 56 and 58, and in the unlocking direction by stop members 70 and 72 secured to backing plate 50 and having laterally projecting fingers 74 contacted by the bar when the bar is moved in the direction to unlock the gate.

The two bolts are held in their locked position in the respective bores by a latch mechanism consisting of a finger 80 pivotally mounted on bar 64 by transversely extending shaft 82 journalled in a bracket 84, the bracket being secured to the bar by welding, riveting or other suitable securing means. Finger 80 is rigidly secured to shaft 82 and extends into a frame 86 having a horizontal member 88 forming an abutment 90 over which a downwardly extending projection 92 seats when the finger is in locked position. Finger 80 extends through an opening 91 in bar 64 and the shaft is held in place against bar 64 by fixture 84. Frame 86 includes a plate 94 supported by member 88 and the second horizontal member 96 spaced upwardly from member 88 and forming a stop for the pivotal movement of finger 80 when the latch is being unlocked. When bar 64 is being moved in the direction to seat bolts 52 and 54 in bores 60 and 62, the movement of finger 80 in slot 98 formed by members 88 and 96 and plate 94 permits projection 92 to drop automatically downwardly over the end 90 of member 88 and hold the bar and the two bolts in their locked position. Finger 80 and shaft 82 may be operated from either side of the gate by handles 100 and 102 formed integrally with shaft 82. Rotation of the handle forwardly, i.e., toward post 18, causes shaft 82 to rotate and lift finger 80 to a position at which projection 92 will be disengaged from abutment 90 and pass along the upper surface of member 88, thus permitting the bar 64 and the two bolts to be retracted. Handles 100 and 102 are positioned angularly relative to finger 80 so that the weight of the two handles, along with the finger, will tend to seat projection 92 downwardly over the end of member 88 and hold it in that position until intentionally lifted therefrom by the use of either of the two handles.

Post 18 in which bores 60 and 62 are disposed may be of any suitable material such as wood, metal or concrete, and the bores can be drilled in the post after the latch has been installed on the gate. In place of the drilled holes in the post, special fixtures having holes for receiving the pins may be attached to the side of the post or to some other suitable supporting structure. The present gate latch structure provides two bolts spaced vertically along the forward edge of the gate, thus resisting twisting or distortion of the gate when the animals press on the gate near the bottom thereof.

In the operation of the present gate latch with the latch mounted on the gate as illustrated in the drawings, when the gate is to be latched, it is closed while the bar and two bolts are withdrawn so that the ends of the bolts are substantially even with the forward end of the gate. After the gate has been moved to closed position with the bolts in alignment with bores 60 and 62, bar 64 is moved forwardly with finger 80 moving along the upper side of member 88. As the two bolts and bar reach their most forward position, projection 92 drops downwardly over abutment 90, retaining bar 64 against the ends of the tubular members 56 and 58 and locking the bolts in bores 60 and 62.

In unlatching the gate, the handles are rotated forwardly, i.e., toward post 18, thus disengaging projection 92 from member 88 and permitting the two bolts and bar to be withdrawn. When the bar engages stops 70 and 72, finger 80 is still in slot 98 with projection 92 resting on the upper side of member 88, thus retaining the finger in position to move forwardly to its latched position when bar 64 is merely pushed forwardly. It is seen from the foregoing operation that a movement of handles 100 and 102 forwardly is necessary to disengage projection 92 from member 88, and then a rearward movement is required for withdrawing the two bolts from bores 60 and 62 while initially maintaining the forward rotation force on the handles. This operation involves counter forces and movement which are extremely difficult to perform by an animal and would not be likely to occur accidentally. The two handles must be held in the position to lift finger 80 while the bolts are being withdrawn.

While only one embodiment of the present gate latch has been described in detail herein, various changes and modifications may be made without departing from the scope of the invention.

I claim:

1. A gate latch comprising two spaced horizontally movable bolts for seating in retaining holes, rigid means supporting said bolts, a vertical bar means connecting said bolts for simultaneous movement thereof, a lock mechanism connected to said bar means for retaining said bolts in latched position and including a means fixed with respect to gate structure forming a latch abutment, a shaft extending generally parallel to said movable bolts and having a member at one end for engaging said fixed latch abutment to lock the gate, a means pivotally attaching the other end of said shaft to said bar means between said bolts, and a handle connected to the pivoted end of said shaft for pivotal movement therewith and movable with said bar means by forces applied in two different directions for unlocking said lock mechanism and moving said bolts between locked and unlocked position.

2. A gate latch as defined in claim 1 in which a frame member supports said rigid means supporting said bolts.

3. A gate latch as defined in claim 2 in which said fixed latch means is mounted on said frame member.

4. A gate latch as defined in claim 3 in which the member engaging said fixed latch means includes a downwardly extending projection and said fixed latch means includes a member providing a forwardly facing abutment for engagement by said projection.

5. A gate latch as defined in claim 4 in which said handle is positioned relative to said finger to cause the projection of said finger to remain in engagement with the abutment as a result of the weight of said handle.

6. A gate latch as defined in claim 5 in which a stop means secured to said frame member limits the travel of said bar means in the latch opening direction.

7. A gate latch as defined in claim 2 in which said frame member is a flat metal plate and said rigid means supporting said bolts are tubular members welded to one side of said plate.

8. A gate latch as defined in claim 5 in which a fixture supports said shaft on said bar means.

References Cited

UNITED STATES PATENTS

| | | | |
|---|---|---|---|
| 309,813 | 12/1884 | Bothwell | 292—162 |
| 1,364,749 | 1/1921 | Graybeal | 292—150 |
| 1,388,017 | 8/1921 | Baumgartner | 292—162 |
| 2,758,861 | 8/1956 | Molloy | 292—57 |

OTHER REFERENCES

Popular Mechanics, June 1952, Corral-Gate Latch, p. 209.

Popular Mechanics (II), October 1955, Livestock Proofed, p. 232.

MARVIN A. CHAMPION, Primary Examiner

R. L. WOLFE, Assistant Examiner

U.S. Cl. X.R.

292—153, 162